Oct. 6, 1970   E. J. DEVINE   3,532,894
OPTICAL TRACKER HAVING OVERLAPPING RETICLES ON PARALLEL AXES
Filed Sept. 15, 1967   4 Sheets-Sheet 3
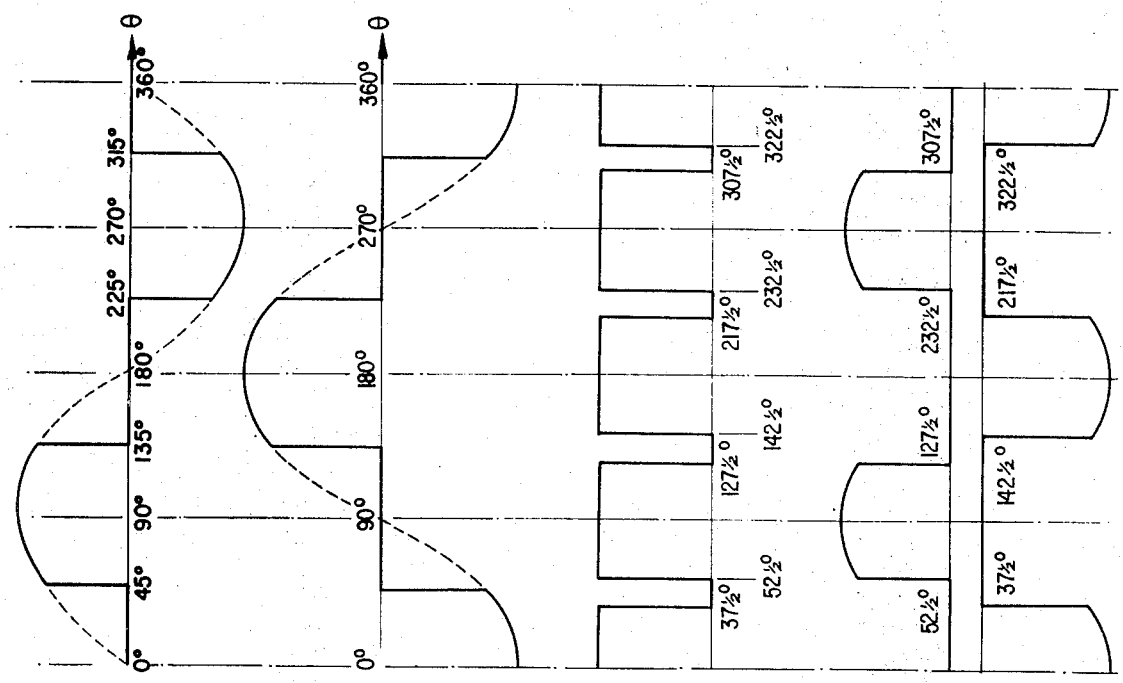
FIG. 8A
FIG. 8B
FIG. 8C
FIG. 8D
FIG. 8E
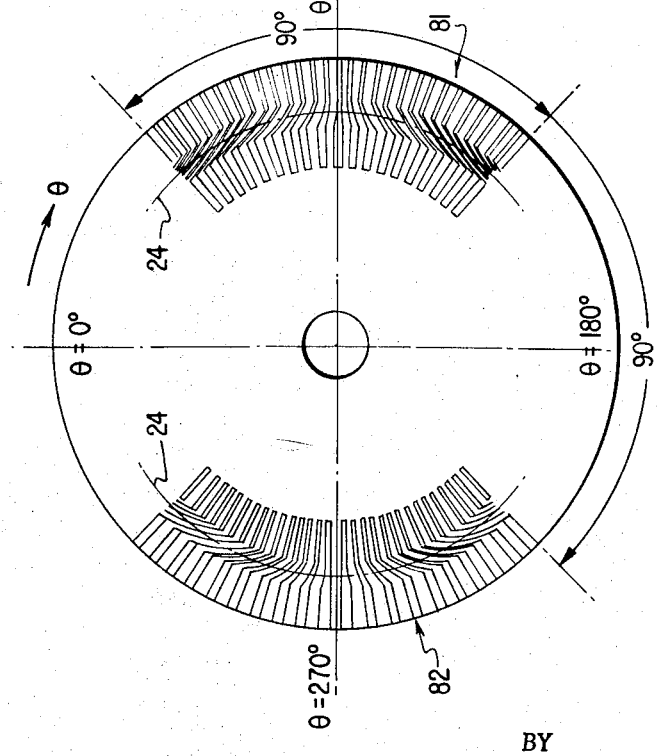
FIG. 6
INVENTOR
EDWARD J. DEVINE
BY
ATTORNEYS Oct. 6, 1970  E. J. DEVINE  3,532,894
OPTICAL TRACKER HAVING OVERLAPPING RETICLES ON PARALLEL AXES
Filed Sept. 15, 1967  4 Sheets-Sheet 4

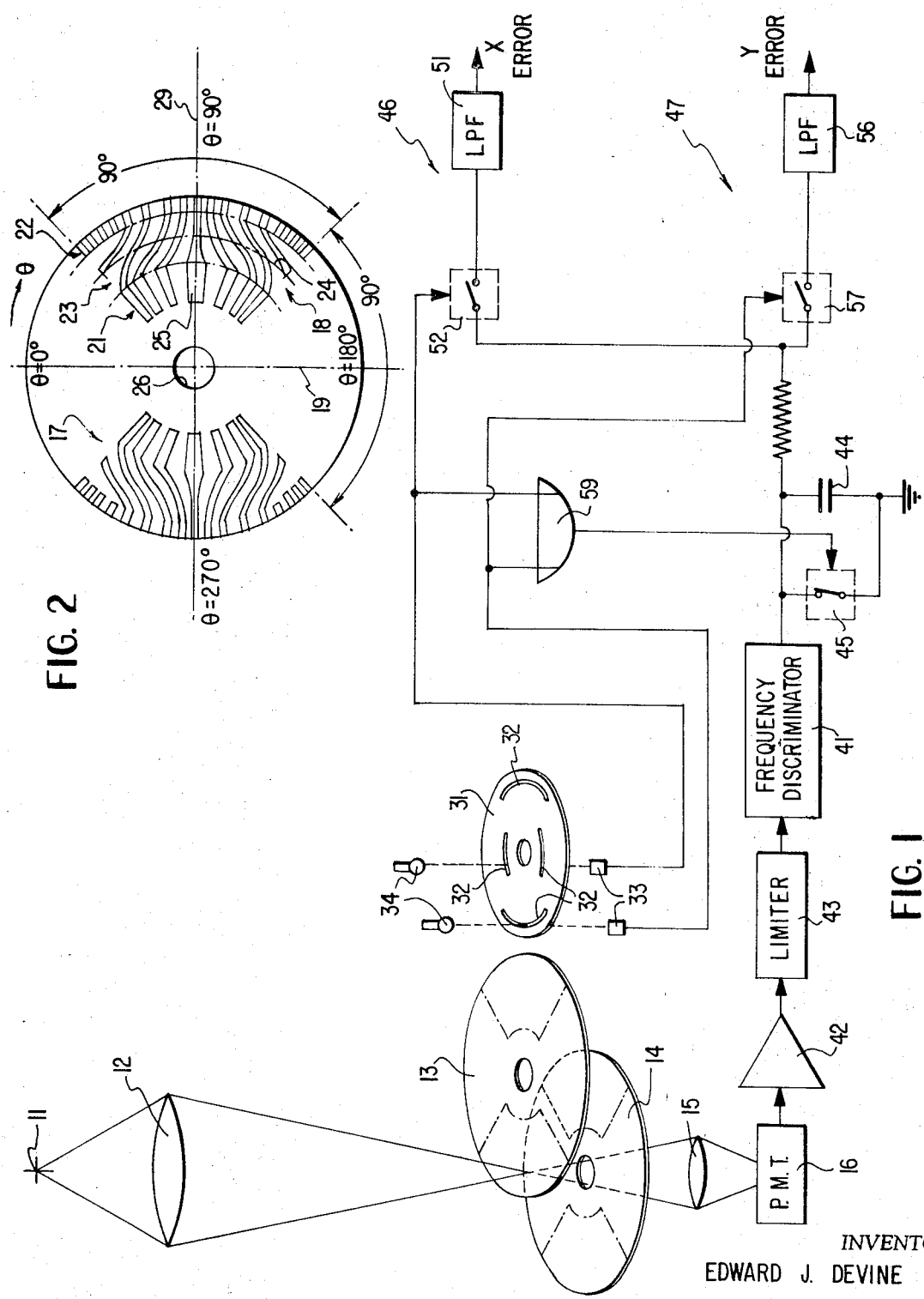

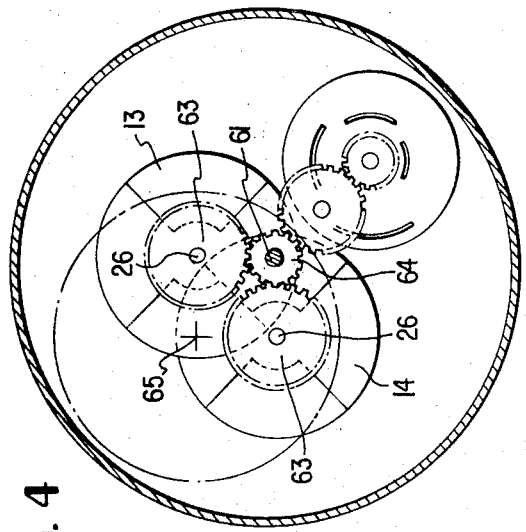
FIG. 4
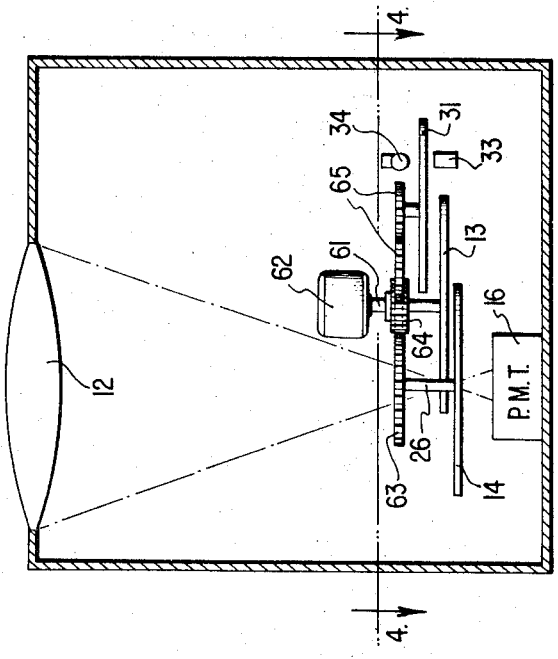
FIG. 5
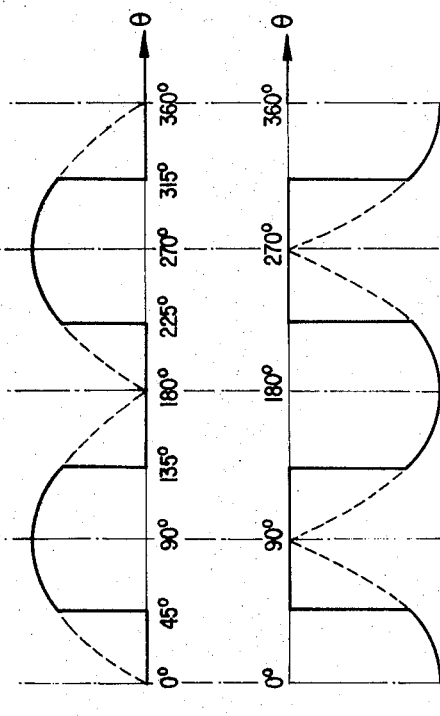
FIG. 3A
FIG. 3B
FIG. 3C
FIG. 3D
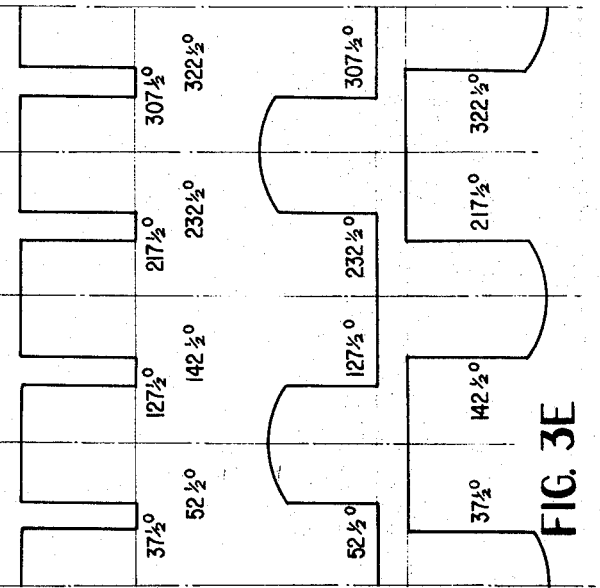
FIG. 3E
INVENTOR
EDWARD J. DEVINE
BY
ATTORNEYS.

FIG. 7

INVENTOR
EDWARD J. DEVINE

BY
ATTORNEYS.

12,532,894
OPTICAL TRACKER HAVING OVERLAPPING RETICLES ON PARALLEL AXES
Edward J. Devine, Laurel, Md., assignor to the United States of America as represented by the Administrator of the National Aeronautics and Space Administration
Filed Sept. 15, 1967, Ser. No. 668,257
Int. Cl. G01d 5/36; G01j 5/20
U.S. Cl. 250—233   8 Claims

ABSTRACT OF THE DISCLOSURE

An optical tracker comprises a pair of frequency modulation reticles, positioned on separate transparent overlapping carriers so that the two reticle patterns are spatially phase displaced by 90° relative to an image of a tracked object. A single photodetector responds to the image chopped by the two reticles to drive X and Y signal channels through an FM discriminator.

---

The invention described herein was made by an employee of the United States Government and may be manufactured and used by or for the Government for governmental purposes without the payment of any royalties thereon or therefor.

The present invention relates generally to optical trackers and more particularly to an optical tracker employing a pair of frequency modulation reticles phase displaced from each other spatially by 90° relative to an image of a tracked object.

Optical trackers for determining the position of point sources, such as stars, generally employe reticles having either amplitude modulation or frequency modulation characteristics. Reticles of the latter type are generally preferred because of greater signal-to-noise ratio with regard to fields of view having multiple sources. In particular, an optical tracker employing a frequency modulation reticle tracks the brightest image to the exclusion of all other images in a field of view. Systems employing amplitude modulation reticles generally, however, derive signals indicative of the average position of all light sources in the field of view. Thus, if a field of view includes two light sources, systems employing amplitude modulation reticles generally derive signals indicating the presence of a single apparent image at a position between the two actual sources. In contrast, an optical tracker employing a frequency modulation reticle derives an indication of the position of the source having the greatest intensity.

Frequency modulation reticles are generally classifiable into two different types; those in which the center of the image field is directed at the center of a reticle carrier disk and a second class wherein the center of the image field is directed at a point removed from the reticle carrier disk center. In the former type, the reticle disk includes a plurality of radially extending, alternately opaque and transparent sectors having a common point at the disk center. The differing sectors have varying degrees of arc, as a function of angular and radial position, whereby a photodetector responsive to light chopped by the reticle pattern derives a signal having maximum frequency swings proportional to the displacement of the image from the reticle and disk center and an instantaneous frequency commensurate with reticle angular position.

In the second type of FM reticle, the "center" of the reticle pattern is located at a radial position removed from the center of the carrier disk. An image focussed on the "center" of the reticle pattern causes a photodetector to derive a constant frequency output signal. The reticle pattern is variable as a function of radial position and angle. Thereby, images focussed on the reticle at regions removed from the reticle "center" modulate the instantaneous frequency of light chopped by the reticle, with the maximum frequency swing from the constant frequency being proportional to the displacement between the image and the reticle "center."

It has been found that reticles employing FM patterns wherein the reticle center is removed from the center of the carrier disk produce more accurate signals than trackers employing reticles having the center of the disk and the reticle pattern in coincidence. Poorer accuracy results with the latter type of system because resolution is inherently poorest at the common merging point of all the radially extending sectors. In contrast, reticles wherein a null is indicated by a constant, finite output frequency have excellent resolution at the center of the field of view because thereat the alternate opaque and transparent segments are diverging away from the edge of the carrier disk. Of course, it is desirable for resolution to be as great as possible at the center of the reticle pattern because optical trackers are generally employed in servo systems attempting to position a source at the center of the reticle pattern.

In the past, optical trackers employing frequency modulation reticles have generally employed two separate optical systems to derive signals indicative of the X and Y positions of a tracked image. The separate optical systems have generally each employed one reticle, one focussing telescope and one photomultiplier tube. In addition to requiring a relatively large amount of expensive equipment, such a system requires an excessive amount of volume, a condition that cannot be tolerated in outer space applications.

According to the present invention, the X and Y coordinate positions of an image are determined with an optical tracker by employing a pair of frequency modulation reticle patterns of the type wherein the pattern center is removed from the disk center. The reticles are spatially removed from each other by 90° with respect to the image and a single light detector.

The reticles are preferably mounted on separate, overlapping transparent disks, whereby the image is chopped by the reticle on the first disk and subsequently chopped by the reticle on the second disk. To provide for successive chopping of the image by the two reticles, the reticle on each disk includes two separate segments, each traversing an arc of approximately 90°. Thereby, when the reticle on one disk is chopping the image, the reticle on the second disk is removed from the image and only the transparent portion of the disk is in the path to the light detector.

In response to the image being chopped by the FM reticles, the photodetector derives a series of variable frequency waveforms, having frequency swings proportional to the X and Y positions of the optical image passing through the reticles. The variable frequency signals are detected by a frequency discriminator, the output of which includes a series of variable amplitude, half wave sinusoids. The half wave sinusoids alternate in maximum amplitude in response to the alternate chopping by the two reticles, whereby alternate peaks of the discriminator output indicate the X and Y positions of the image being tracked. The alternate peaks are coupled to separate channels to derive indications of the direction and amplitude of the image from the centers of the reticle patterns.

It has been found through experimentation that the output of the frequency discriminator has a tendency to generate large amplitude pulses in response to sudden changes in the FM signal applied thereto. The large amplitude signals or spikes are derived for a relatively short duration subsequent to switching between the X and Y reticle patterns. Such spikes, if allowed to be coupled to the X and Y amplitude detecting channels, could introduce serious error in the positional information derived.

According to a further aspect of the present invention, the derivation of signal spikes is avoided by gating the output of the frequency discriminator to the position detecting channels for a time period slightly less than the time required for the 90° arc of each reticle to be positioned before the light detector and in synchronism with rotation of the reticle carrier disks.

It is, accordingly, an object of the present invention to provide a new and improved frequency modulation optical tracker.

It is another object of the present invention to provide a frequency modulation optical tracker wherein only a single optical system is required.

It is another object of the present invention to provide an optical tracker employing frequency modulation reticles having sudden transitions therein which have a tendency to cause an FM discriminator to derive relatively large amplitude, spurious outputs, and wherein means are provided for eliminating such spurious outputs.

It is another object of the present invention to provide a new and improved optical tracker employing a pair of frequency modulation reticles displaced in phase 90° relative to each other for chopping an optical image onto a single photodetector.

The above and still further objects, features and advantages of the present invention will become apparent upon consideration of the following detailed description of one specific embodiment thereof, especially when taken in conjunction with the accompanying drawings, wherein:

FIG. 1 is a schematic diagram of the optical and electronic systems employed in a preferred embodiment of the present invention;

FIG. 2 is a plan view of a single frequency modulation reticle of the type employed in the system of FIG. 1;

FIGS. 3A–3E are waveforms indicating the manner in which the system of FIG. 1 functions;

FIG. 4 is a plan view of the reticles and the drives therefor in a preferred embodiment of the present invention;

FIG. 5 is a side view of the preferred embodiment illustrated by FIG. 4;

FIG. 6 is a plan view of a frequency modulation reticle employed in a second embodiment of the invention;

FIG. 7 is a schematic diagram of the optical and electronic systems employed in an embodiment of the invention utilizing a pair of reticle disks of the type illustrated by FIG. 6; and FIGS. 8A–8E are waveforms indicating the manner in which the system of FIG. 7 functions.

Reference is now made to FIG. 1 of the drawings, wherein there is illustrated in schematic form a system for determining the X, Y coordinate positions of point source 11 of optical energy. The image of source 11 is focussed by lens 12 at a point approximately midway between spatially overlapping, transparent reticle carrying disks 13 and 14. Disks 13 and 14 are positioned in parallel planes and are relatively close to each other, whereby the image of source 11 is substantially focussed on each of the reticle carrying disks. Light chopped by disks 13 and 14 is focussed by lens 15 on a light detector, photomultiplier tube 16.

Light chopping reticles 13 and 14 are identically constructed in the manner indicated by FIG. 2. The disk illustrated by FIG. 2 is generally transparent and includes a pair of identical frequency modulation patterns 17 and 18 which comprise the reticle. Each of patterns 17 and 18 extends for an arc of 90° on opposite sides of centerline 19. The edges of reticle patterns 17 and 18 are separated from each other by 90°, whereby perfect symmetry of the different reticle patterns is achieved. Since the two reticle patterns 17 and 18 are identical, being mirror images of each other relative to centerline 19, a description of pattern 18 suffices for both.

Reticle pattern 18 includes three separate segments, namely inner and outer constant frequency modulation amplitude segments 21 and 22 and center variable frequency modulation amplitude segment 23. Variable frequency modulation amplitude segment 23 includes a plurality of alternate opaque and transparent, radially extending fingers having variable sectors as a function of angle and radius. The fingers are positioned so that with constant disk rotation velocity the instantaneous chopping frequency of a light image focussed on a circle defined by radius 24 is constant as a function of disk rotation angle. As the fingers progress outwardly from and inwardly of radius 24, the maximum and minimum chopping frequencies increase and decrease, respectively, as a function of rotation angle, assuming constant disk rotation velocity.

To achieve these variations in chopping frequency, symmetrical opaque section 25 is positioned along line 29, at an angle 90° displaced from centerline 19. Opaque section 25 has a relatively wide base at its point nearest the center 26 of the disk and sides that taper inwardly with increasing radius. The transparent sections adjacent opaque section 25 are both unsymmetrical and have a greater length along radii less than radius 24 than those portions of the transparent segments are radii greater than radius 24. In a similar manner, a plurality of successive, alternate opaque and transparent sections alternately are provided to 45° on either side of line 29. Assuming constant rotation velocity of the disk, the pattern of alternate opaque and transparent sections in reticle pattern 18 causes light to be chopped in conformance with:

$$f = f_o + A(r - r_o) \sin \theta \tag{1}$$

where:

$f$ is the instantaneous frequency of light chopped by the disk;

$f_o$ is the frequency of light chopped by the disk if the image is focussed on the circle defined by radius 24;

$A$ is a constant;

$r$ is the radial position of the light image in sector 23;

$r_o$ is the length of radius 24; and $\theta$ is the angular position of the disk relative to line 19.

Equation 1 applies only for light chopped by reticle pattern 23, i.e., Equation 1 applies only when the light image falls within the boundaries defined by $45° \leq \theta \leq 135°$ and for $r_{min} \leq r_{max}$, where $r_{max}$ and $r_{min}$ are the radii of the pattern sector 23 farthest from and closest to disk center 26, respectively.

To limit the frequency excursion derived from photomultiplier 16, and yet provide a finite frequency output from the pohtomultiplier in response to optical images focussed at radii outside the limits of sector 23, as defined by $r_{min}$ and $r_{max}$, patterns 21 and 22 are provided. Each of patterns 21 and 22 includes a plurality of radially extending, alternate opaque and transparent fingers. Each of the fingers in patterns 21 and 22 covers the same degree of arc as the end of each finger to which it is connected in pattern 23. Since the fingers of patterns 21 and 22 cover the same arc length as the ends of the fingers of pattern 23 to which they are connected, the fingers of patterns 21 and 22 are of a constant frequency nature and limit the maximum and minimum frequency excursions derived from photomultiplier tube 16.

While the reticle patterns 17 and 18 are identical, the mathematical relationship for pattern 17 differs slightly from that of pattern 18. The difference in the mathematical relationship of the two patterns occurs because they are on opposite sides of centerline 19, whereby photomultplier tube 16 derives frequencies having similar polarities relative to $f_o$ for both reticle patterns 17 and 18.

Hence, reticle pattern 17 causes photomultiplier tube 16 to derive an output signal in accordance with:

$$f = f - A(r - r_0) \sin \theta \qquad (2)$$

for $225° \leq \theta \leq 315°$ and $r_{min} \leq r \leq r_{max}$.

Returning now to the schematic diagram of FIG. 1, disks 13 and 14 are mounted so that their reticle patterns are spatially displaced from each other by 90° relative to the focussed image and detector 16, whereby the reticle pattern of disk 13 chops the optical image of source 11 while the transparent segment of disk 14 is in the path of the chopped optical energy. Similarly, but in an opposite manner, the transparent portion of disk 13 is intercepting the image of source 11 while the reticle pattern of disk 14 is chopping the image. Because of the 90° spatial separation of the reticles of disks 13 and 14, the FM signals derived from photodetector 16 alternately represent the X and Y coordinate positions of source 11 relative to a common point between disks 13 and 14. As seen infra, the 90° phase displacement of the signals chopped by disks 13 and 14 is achieved by displacing the disks equally from a common drive point, about which they are spatially displaced by 90°. The disks are connected to the common drive point, so that they are rotated in opposite directions at constant velocity.

To establish reference phases for separating the alternate frequency modulation waves derived from photomultiplier 16, opaque phase reference disk 31, driven synchronously with and at the same velocity as reticle disks 13 and 14, is provided. Phase reference disk 31 includes four transparent arcuate sections 32, each subtending an angle of 75°. Oppositely disposed transparent, arcuate sections 32 are at the same radius from the center of disk 31, with adjacent ones of sections 32 at different radii. The four sections 32 are displaced from each other angularly by 90°. Positioned at the two radii of sections 32 from the center of disk 31 is a separate low intensity photodetector 33 and lamp 34 combination. Thereby, each of the two photodetectors 33 derives a finite, binary one output only while the two transparent sections 32 is aligned therewith to enable an optical path to be formed between it and the corresponding lamp 34. The two photodetectors 33 thereby derive four reference phase rectangular waves, each having a duration commensurate with 75° of arc of reticle disks 13 and 14, and being in 90° relative phase relationship.

The four reference phase signals derived from photodetectors 33 and the FM signal generated by photomultiplier 16 are applied to the electronics unit of the present invention. The electronics unit includes frequency discriminator 41 responsive to the variable frequency output of photomultiplier 16, after suitable amplification by amplifier 42 and amplitude limiting by limiter 43. Discriminator 41 includes circuitry for deriving a variable amplitude signal indicative of the departure of the frequency chopped by disks 13 and 14 from the reference chopping frequency associated with radius 24. In particular, discriminator 41 derives a zero amplitude signal in response to the reference frequency being applied thereto, while positive and negative voltages are generated thereby in response to frequencies greater and less than the reference frequency. Across the output circuit of frequency discriminator 41 is connected capacitor 44, shunted by the normally closed contacts of switch 45.

The varying amplitude signal derived by frequency discriminator 41 across the plates of capacitor 44 is applied in parallel to phase detecting channels 46 and 47, that derive signals proportional to the X and Y coordinate locations of the optical image of source 11, relative to radii 24 of reticle disks 13 and 14. Channel 46 includes normally open switch 52 series connected between the output of frequency discriminator 41 and the input of low pass filter 51 and responds to the reference phase signals generated by one of photodetectors 33. Similarly, channel 47 comprises normally open switch 57, connected in series between the output of discriminator 41 and the input of low pass filter 56, but is responsive to reference phase signals 90° displaced from the reference phases supplied to channel 46.

Switches 52 and 57 are connected to a different one of each of the photodetectors 33, with switch 52 being closed in response to oppositely located transparent sections 32 passing in front of their associated photodetector 33, and switch 57 being closed in response to transparent segments 32 passing light from lamp 34 to the other one of photodetectors 33. Thereby, for each revolution of disk 31 each of switches 52 and 57 is closed twice, each time for slightly less than one-quarter of a revolution of reticle disks 13 and 14, and the switches are closed at different times, displaced by 90°. On the other hand, normally closed switch 45 is controlled in response to the output of both of the photodetectors 33 so that the switch 45 is open from the 75° of arc covered by each of the opaque sections 32. To this end, OR gate 59 is connected to be responsive to both of the photodetectors 33 and supplies a voltage waveform to open contacts 45 during the four 75° arc lengths.

To provide a better and more complete understanding of the present invention, reference is now made to the waveforms of FIGS. 3A–3E. In discussing the waveforms of FIGS. 3A–3E, it is assumed that reticle disk 13 is positioned to derive information indicative of the X coordinate position of source 11, while disk 14 chops light from source 11 in accordance with the Y position thereof. In addition, it is assumed that source 11 is located at a position to cause the image thereof to be focussed at a point beyond radius 24 of disk 13, while the image focussed on disk 14 is at a position interior of the disk relative to radius 24.

The variation of frequency relative to $f_0$, as a function of rotation angle, $\theta$, of disk 13, derived from photomultiplier tube 16 in the X coordinate direction is indicated as the ordinate in FIG. 3A and comprises, for each cycle of rotation of reticle 13, a pair of half wave sinusoids having frequency variations represented by Equations 1 and 2, supra. The frequency variations resulting from chopping of the image by reticle disk 13 occur only in the intervals $45° \leq \theta \leq 135°$ and $225° \leq \theta \leq 315°$. The amplitude of the frequency variation is positive relative to $f_0$, the reference frequency along radius 24. As reticle disk 13 rotates, the chopping frequency increases from a minimum at $\theta = 45°$ to a maximum at $\theta = 90°$ and drops back to the minimum value at $\theta = 135°$. The chopped light impinging on photomultiplier 16 as a result of disk 13 goes from a zero frequency to a finite frequency with a step jump and, theoretically, such a step should be derived from frequency discriminator 41.

In response to the assumed conditions of the position of the optical image relative to reticle disk 14, the frequency of light impinging on photomultiplier 16 occurs as indicated by the waveform of FIG. 3B. It is noted from FIG. 3B that frequency variations occur only in the region $0° \leq \theta \leq 45°$, $135° \leq \theta \leq 225°$ and $315° \leq \theta \leq 360°$. In the other regions, $45° \leq \theta \leq 135°$ and $225° \leq \theta \leq 315°$, there is no output of photomultiplier 16 due to chopping by reticle wheel 14. This is the result that is to be expected since reticle wheels 13 and 14 have patterns displaced from each other by 90° and include alternate chopping and transparent patterns.

A further observation from FIG. 3B is that the frequency variations are in the negative direction relative to $f_0$ and the variations of FIG. 3A. This is to be expected as the image of source 11 is assumed to be at an interior point of the pattern of reticle disk 14 relative to radius 24. It is also noted that the amplitude of the maximum swing of the waveform of FIG. 3B is greater than the frequency swing of FIG. 3A. Such a swing occurs because the optical image in the Y direction is assumed to be positioned farther from reference radius 24 than the optical image in the X direction.

Hence, the maximum frequency excursions derived from photomultiplier 16 for the alternate segments of reticle disks 13 and 14 result in materially different frequency variations from the photomultiplier. The frequency variations derived from photomultiplier 16 are applied to frequency discriminator 41, including circuitry whereby a zero output voltage is derived in response to an input frequency equal to the frequency associated with radii 24 of reticle disks 13 and 14. Hence, if one or the other of reticle disks 13 and 14 has its pattern aligned with the lines associated with X=0 or Y=0, frequency discriminator 41 derives a zero output for that particular interval. The discriminator theoretically derives during all other intervals, waveforms of the types illustrated by FIGS. 3A and 3B.

It has been found, however, that the theoretical waveforms of FIGS. 3A and 3B are not actually derived from frequency discriminator 41 unless switch 45 is included. Sudden variations occurring as a result of transitions in the reticle pattern cause large amplitude pulses to be derived by frequency discriminator 41 at the edge of the reticle patterns, e.g., when $\theta=135°$ in the waveforms of FIGS. 3A and 3B. To prevent such spikes from being coupled to detector channels 46 and 47, OR gate 59 responds to photodetectors 33 to feed the waveform of FIG. 3C to switch 45. Thereby, switch 45 is closed during the transition period, and for 7.5° of arc rotation of reticles 13 and 14 to either side of the transition period.

Hence, frequency discriminator 41, in combination with switch 45 and capacitor 44, feeds a series of varying amplitude and polarity spaced pulses to detector channels 46 and 47 during each rotation cycle of reticle disks 13 and 14. During the first 37.5° of each cycle of rotation, switch 57 in channel 47 is closed while switch 52 in channel 46 is maintained open in response to signals from photodetectors 33. The output of frequency discriminator 41 is negative during the 37.5° interval being considered, whereby the negative D.C. signal indicated in FIG. 3E in the interval $0°\leq\theta\leq37.5°$ is applied to low pass filter 56. During the next 15°, the output of frequency discriminator 41 is shunted to ground by switch 45.

In the interval $52.5°\leq\theta\leq127.5°$, photodetectors 33 feed signals to channels 46 and 47, whereby switch 52 is closed while switch 57 is open. In said interval, the output of frequency discriminator 41 is positive, as indicated by FIG. 3A. The positive output of frequency discriminator 41 occurring during the interval $52.5°\leq\theta\leq127.5°$ is passed through switch 52 to low pass filter 51 as indicated by FIG. 3D, which averages the positive signal applied thereto to derive a positive D.C. signal. The positive D.C. signal derived by low pass filter 51 is proportional to the amplitude and direction of the image of source 11 relative to radius 24 of reticle disk 13 to provide an indication of the image displacement in the X direction.

During the next interval when one of photodetectors 33 is activated, $142.5°\leq\theta\leq217.5°$, switch 57 is again closed to the exclusion of switch 52, whereby the negative output of frequency discriminator 41 is coupled to low pass filter 56, as indicated by FIG. 3E. Low pass filter 56 responds to negative output of frequency discriminator 41 to derive a negative voltage proportional to the displacement of image 11 relative to reference radius 24 of reticle disk 14 and the image position in the Y direction.

During the following interval when one of the photodetectors 33 is activated, $232.5°\leq\theta\leq307.5°$, switch 52 is again closed while the switch in channel 47 is open and the positive output of discriminator 41 is coupled to low pass filter 51. In the manner described, the output signals of discriminator 41 are alternately fed to channels 46 and 47 that derive D.C. signals indicative of the X and Y positions of the optical source.

It is thus seen that each of low pass filters 51 and 56 is connected to the output of frequency discriminator 41 for approximately one-half of each cycle of rotation of reticle disks 13 and 14, as indicated by FIGS. 3D and 3E. The low pass filters smooth the pulsating voltages applied thereto to derive D.C. signals indicative of the amplitude and position of the optical image relative to the reference radii 24 of reticle disks 13 and 14. These D.C. signals may be utilized to control servo mechanisms for controlling the position of image 11 on the two reticle disks in a manner well known to those skilled in the art.

Reference is now made to FIGS. 4 and 5 of the drawings wherein details of the mechanical construction of the optical tracker of the present invention are illustrated in plan and side views, respectively. From FIG. 4, reticle disks 13 and 14 are positioned so that their reticle patterns lie in substantially parallel relationship. The 90° spatial relationship between the reticle patterns and the optical image is obtained by positioning the centers of disks 13 and 14 equally from the center of drive shaft 61 of motor 62. Centers 26 of reticle disks 13 and 14 are located along lines orthogonal to each other and intersecting the center of drive shaft 61. To drive reticle disks 13 and 14 at a constant velocity and in opposite directions, the disks carry gears 63, concentric with their centers and engaging gear 64 driven by shaft 61.

The positional relationship of reticle disks 13 and 14 reltaively to shaft 61 establishes an X=0, Y=0 position for the image of source 11 at point 65, equally spaced from the centers of reticle wheels 13 and 14. Thus, the centers of reticle wheels 13 and 14 and shaft 61, as well as point 65, define the corners of a square with the two reticle centers at opposite apexes of the square and the center of shaft 64 and point 65 at the other apexes of the square. Positioned immediately below point 65 is photomultiplier tube 16, whereby the photomultiplier tube generates outputs commensurate with the reference frequency in response to the star image impinging on reference radii 24 of reticle wheels 13 and 14.

To provide the phase reference signals and prevent light from lamps 34 from interfering with light from source 11, disk 31 is driven by motor 62 via gears 64 and 65. Gear 65 extends in a direction 180° displaced from the diagonal between shaft 61 and point 65 to minimize light interference between lamps 34 and photodetector 16.

While the system described in conjunction with FIGS. 1–3 is noted for its simplicity, it has the disadvantage of requiring D.C. coupling between frequency discriminator 41 and demodulation channels 46 and 47, whereby drift in the discriminator output causes errors to be derived in the indications of the X and Y positions of radiation source 11. D.C. coupling between discrminator 41 and channels 46 and 47 is necessary because of the full wave reticle pattern of the disk illustrated by FIG. 2, that results in a D.C. output of freqeuncy discriminator 41 for any particular information channel, as noted by the waveforms of FIGS. 3A–3E.

To avoid the problems associated with D.C. coupling between the output of frequency discriminator 41 and demodulator channels 46 and 47, the reticle disk of FIG. 6 is utilized instead of the disk of FIG. 2. The reticle disk of FIG. 6 is similar to the disk of FIG. 2 in that a pair of FM reticle patterns 81 and 82 is provided and these patterns are separated by transparent sections having an arc length of approximately 90°. The reticle patterns of the FIG. 6 disk, however, are not mirror images of each other, but can be represented as a true sinusoid, such as defined by Equation 1, within the boundaries defined by $45°\leq\theta\leq135°$; $225°\leq\theta\leq315°$, for $r_{min}\leq r\leq r_{max}$. Hence, in the region $45°\leq\theta\leq135°$, reticle pattern 81 is identical with reticle pattern 18 of FIG. 2, and the fingers comprising the pattern converge as a function of increasing radius. In the region $225°\leq\theta\leq315°$, however, reticle pattern 82 is arranged so that there is a greater number of lines intercepting light from a source interiorly of centerline 24 than at radii greater than the centerline, whereby the pattern fingers diverge as a function of increasing radius. Thereby, the frequency variation as a function of angular rotation of an image focussed on the reticle disk of FIG. 6, at any point removed from centerline 24, is defined as a sinusoid as a function of angle in the regions $45° \leq \theta \leq 135°$; $225° \leq \theta \leq 315°$.

Because of the true sinusoidal pattern of the frequency modulation on the disk of FIG. 6, an optical tracker employig such disks includes circuitry modified relative to the circuitry of FIG. 1. The modified circuitry is illustrated by the schematic diagram of FIG. 7, wherein reticle disks 84 and 85 of the type shown by FIG. 6 are positioned in precisely the same manner as indicated supra in conjunction with FIGS. 4 and 5 for disks 13 and 14. Reticle disks 84 and 85 intercept optical energy from a suitable variable position source whereby a chopped F.M. image impinges on photomultiplier tube 16, the output of which is fed to frequency discriminator 41 via amplifier 42 and limiter 43.

As in the system of FIG. 1, the output of frequency discriminator 41 is normally short-circuited by normally closed switch 45, approximately at the same that a sudden transition occurs in the reticle pattern of disks 84 and 85 during four 15° periods of each revolution of reticle disks 84 and 85. Switch 45 is opened in response to a finite output voltage of OR gate 86. OR gate 86 is responsive to phase reference signals derived from disk 87, that is rotated synchronously with and at the same velocity as reticle disks 84 and 85. Phase reference disk 87 is generally similar to phase reference disk 31, FIG. 1, but the former disk includes four transparent segments 91–94, each lying along a diffeernt radius from the disk center and covering an arc of approximately 75°. Each of transparent segments 91–94 cooperates with a separate lamp and photodetector pair, the lamps being denominated by reference numerals 95–98 and the photodetectors by reference 99–102. The reference phase signals generated by photodetectors 99–102 are coupled to OR gate 86, to open switch 45 during the intervals:

$0° \leq \theta \leq 37.5°$; $52.5° \leq \theta \leq 127.5°$;
$142.5° \leq \theta \leq 217.5°$; $232.5° \leq \theta \leq 307.5°$; and
$322.5° \leq \theta \leq 360°$.

The reference phase singals generated by photodetectors 99–102 are also coupled to phase detecting channels 103 and 104, also responsive to the output of frequency discriminator 41 via the A.C. coupling path established by capacitor 105. Channels 103 and 104 respond to the phase reference signals and the discriminator 41 output to derive D.C. signals propotrional to the X and Y locations of the image focussed on sinusoidal reticle disks 84 and 85.

Demodulating channels 103 and 104 respectively include low pass filters 106 and 107, selectively connected to the A.C. output of frequency discriminator 41 via normally open switches 108–111. are directly connected to the inputs of filters 106 and 107 from frequency discriminator 41, while switches 109 and 110 are connected to the filters via polarity reversing amplifier 113, having a gain of minus one. Switches 108–111 are connected with photodetectors 99–102 so that the switches are closed during each revolution of reticle disks 84 and 85 in accordance with:

Switch closed:      $\theta$
108 _____ 52.5°–127.5°
109 _____ 232.5°–307.5°
110 _____ 142.5°–217.5°
111 _____ 0°–37.5°; 322.5°–360°

To provide a more complete understanding of the manner in which the system of FIG. 7, incorporating a pair of reticle disks of the type shown by FIG. 6, functions, reference is made to the waveforms of FIGS. 8A–8E. FIGS. 8A and 8B are waveforms respectively illustrating the frequency variations in the output of photomultiplier tube 16 in response to chopping of an optical image by reticle disks 84 and 85 along the X and Y coordinate directions. The image chopped by reticle disk 84 is presumed to lie beyond the radius 24 thereof, whereby the frequency variation is positive above a reference level in the interval of $45° \leq \theta \leq 135°$ and negative in the interval $225° \leq \theta \leq 315°$. The frequency swing indicative of image position in the Y coordinate direction, resulting from chopping of the optical image by reticle disk 85, is negative in the intervals of $0° \leq \theta \leq 45°$; $315° \leq \theta \leq 360°$, while the variation is positive for values of $135° \leq \theta \leq 225°$, since the Y position of the image is less than radius 24 of disk 85. The frequency variations derived from photomultiplier tube 16 are converted into amplitude variations by frequency discriminator 41, the output of which is positively shifted to a zero level during the intervals when none of the arcuate, transparent segments 91–95 on reference phase disk 87 allows light to impinge on photodetectors 99–102, as indicated by the waveform of FIG. 8C.

The two opposite polarity sinusoidal like, pulse waveforms of FIG. 8A are converted into a pair of positive going sinusoidal like waveforms, having the shape indicated by FIG. 8D, by the circuitry including switches 108 and 109. This relationship is seen by noting that in the interval of $52.5° \leq \theta \leq 127.5°$, switch 108 is closed, whereby most of the information in the positive going portion of the waveform of FIG. 8A is coupled directly to low pass filter 106. During the interval of $$232.5° \leq \theta \leq 307.5°$$

the negative portion of the waveform of FIG. 8 is coupled, in polarity inverted form, to low pass filter 106, because switch 109 is closed during the stated interval and the discriminator 41 output is connected to the filter via phase inverting amplifier 106.

In a similar manner, low pass filter 107 responds to the waveform of FIG. 8B, to derive the negative going pulsating waveform of FIG. 8E. This is seen by noting that in the intervals of $0° \leq \theta \leq 37.5°$, and $$322.5° \leq \theta \leq 360°$$

switch 111 is closed, whereby the negative going portion of the frequency discriminator 41 output is coupled to low pass filter 107. In the interval of $142.5° \leq \theta \leq 217.5°$, switch 110 is closed, whereby the positive output of frequency discriminator 41 is inverted to a negative going waveform that is coupled to the input of low pass filter 107. Filters 106 and 107 respond to the half-wave rectified inputs thereof to derive positive and negative voltages respectively indicative of the position of an optical image focussed on reticle disks 84 and 85.

While I have described and illustrated several specific embodiments of my invention, it will be clear that variations of the details of construction which are specifically illustrated and described may be made without departing from the true spirit and scope of the invention as defined in the appended claims.

I claim:
1. A tracker for a source of optical energy comprising first and second reticles, each of said reticles positioned on respective parallel displaced axes of rotation in a spatially overlapping relationship, each of said reticles having alternate frequency modulation patterns and transparent sectors, means for rotating said reticles in synchronism about said axes such that said patterns alternately frequency modulate the optical energy, said patterns chopping light at a constant reference frequency along an arc of constant radius, optical detector means responsive to optical energy propagating through said patterns, means for substantially focussing an image of said source on both of said reticles and for directing the image chopped by said patterns on said detector means, a frequency discriminator coupled with said detector means, said discriminator deriving a predetermined, constant amplitude output signal in response to the detector deriving a signal equal in frequency to said reference frequency, means for generating a first series of reference pulses, each of said first pulses occurring in coincidence with the chopping of light by said patterns on said first reticle, means for generating a second series of reference pulses, each of said second pulses occurring in coincidence with the chopping of light by said patterns on said second reticle, and first and second gating means coupled to the output of said discriminator, said first gating means, further, being coupled to said first generating means and rendered conductive by each of said first pulses in coincidence with the chopping of light by said first reticle, and said second gating means, further, being coupled to said second generating means and rendered conductive by each of said second pulses in coincidence with the chopping of light by said second reticle for deriving indications of the coordinate positions of the image substantially focussed on said reticles.

2. The tracker of claim 1 wherein said means for rotating comprises a constantly rotating shaft, a drive for each of said reticles at the center of each reticle, said drives being driven by said shaft, said centers being equally spaced from said shaft along lines extending at right angles to each other.

3. The tracker of claim 1 wherein said patterns produce sudden frequency transitions in an output of said detector means, and means for decoupling signals from said gating means during said transitions.

4. The tracker of claim 3 wherein said means for decoupling signals includes an OR gate actuated by said reference pulses and a switch interposed between said discriminator and said gating means and responsive to said OR gate to decouple said discriminator from said gating means during said transitions.

5. The tracker of claim 1 wherein each of said frequency modulation patterns have at least one segment having radially extending fingers and covering an arc length of substantially 90°, said fingers having the same separation at all other radii, and a transparent segment at all angles other than those traversed by said at least one finger including segment and at the radii of said at least one finger including segment.

6. The tracker of claim 5 wherein each pattern includes a pair of said finger including segments, said transparent segment separating said finger including segments by arc lengths of approximately 90°, one of said finger including segments having the fingers thereof diverging as a function of increasing radius, the other of said finger including segments having the fingers thereof converging as a function of increasing radius, and only A.C. coupling means connecting said discriminator to said outputs.

7. The tracker of claim 6 wherein said patterns produce sudden frequency transitions in an output of said detector means, and means for decoupling signals from said gating means during said transitions.

8. The tracker of claim 7 wherein said means for decoupling signals includes an OR gate actuated by said reference pulses and a switch interposed between said discriminator and said gating means and responsive to said OR gate to decouple said discriminator from said gating means during said transitions.

References Cited

UNITED STATES PATENTS

| | | | |
|---|---|---|---|
| 2,442,910 | 6/1948 | Thomson | 250—233 X |
| 2,961,545 | 11/1960 | Astheimer et al. | 250—203 |
| 3,004,169 | 10/1961 | Fairbanks et al. | 250—233 |
| 3,046,541 | 7/1962 | Knox | 250—229 X |
| 3,143,654 | 8/1964 | Aroyan et al. | 250—233 |
| 3,239,674 | 3/1966 | Aroyan | 250—233 X |
| 3,348,050 | 10/1967 | Bez | 250—203 X |
| 3,379,891 | 4/1968 | Aroyan | 250—203 X |

FOREIGN PATENTS 968,581    9/1964    Great Britain.

ROBERT SEGAL, Primary Examiner

U.S. Cl. X.R.

250—203